(12) United States Patent  
Danley et al.

(10) Patent No.: US 7,264,403 B1
(45) Date of Patent: Sep. 4, 2007

(54) OPTICAL FERRULE HAVING A COVERING AND ASSOCIATED METHOD OF ABLATING AN OPTICAL FIBER

(75) Inventors: Jeffrey D. Danley, Denver, NC (US); Paul A. Sachenlk, Corning, NY (US); Robert S. Wagner, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/416,038

(22) Filed: May 2, 2006

(51) Int. Cl.
G02B 6/36 (2006.01)
G02B 6/38 (2006.01)

(52) U.S. Cl. .............. 385/60; 385/53; 385/55; 385/56; 385/58; 385/60; 385/61; 385/62; 385/63; 385/64; 385/66; 385/67; 385/68; 385/70; 385/72; 385/76; 385/77; 385/78; 385/79; 385/80; 385/81; 385/82; 385/83; 385/84; 385/85

(58) Field of Classification Search ............ 385/60–68, 385/53, 55, 56, 58, 70, 72, 76–85
See application file for complete search history.

(56) References Cited

U.S. PATENT DOCUMENTS

| | | | | |
|---|---|---|---|---|
| 5,291,570 A | * | 3/1994 | Filgas et al. ............... | 385/78 |
| 5,386,488 A | * | 1/1995 | Oikawa ..................... | 385/92 |
| 5,421,928 A | | 6/1995 | Knecht et al. ............ | 156/153 |
| 6,004,046 A | * | 12/1999 | Sawada .................... | 385/92 |
| 6,270,940 B2 | * | 8/2001 | Goto ....................... | 430/201 |
| 2003/0008176 A1 | * | 1/2003 | Koujima et al. ......... | 428/694 T |
| 2003/0111354 A1 | * | 6/2003 | Hara et al. ............... | 205/291 |
| 2004/0112877 A1 | * | 6/2004 | Smithson et al. ...... | 219/121.69 |
| 2005/0094945 A1 | | 5/2005 | Danley et al. | |
| 2005/0232564 A1 | | 10/2005 | Jones et al. | |

* cited by examiner

*Primary Examiner*—Frank G. Font
*Assistant Examiner*—Jerry Martin Blevins
(74) *Attorney, Agent, or Firm*—Jeffrey S. Bernard (57) ABSTRACT

An optical ferrule is provided with a ferrule body having a front face and at least one covering applied to the front face to protect the front face of the ferrule from a laser beam used during a trimming process. The optical ferrule may also have a second covering disposed between the front face of the ferrule and the first covering to assist in adhering the first covering to the optical ferrule. A method is also provided for applying the first covering or the first covering and the second covering to the front face of the ferrule. A method is also provided for trimming, and in particular, ablating portions of one or more optical fibers that protrude beyond the front face of the ferrule.

3 Claims, 7 Drawing Sheets

OPTICAL FERRULE HAVING A COVERING AND ASSOCIATED METHOD OF ABLATING AN OPTICAL FIBER

BACKGROUND OF THE INVENTION

1. Field of the Invention

The present invention relates generally to an optical ferrule having at least a first covering on at least a portion of the front face to reflect a laser beam during trimming of optical fibers, and to a method of covering at least a portion of the front face of the optical ferrule. The invention also relates to an associated method of ablating an optical fiber protruding beyond the front face of the ferrule. The at least one covering on the optical ferrule allows the optical fiber(s) that protrude from the ferrule to be laser trimmed to less than about 30 nm without damaging the front face of the optical ferrule.

2. Technical Background

Installing optical fibers into an optical ferrule is generally an imprecise operation. The optical fibers typically extend beyond the front face of the optical ferrule after they are secured in the optical ferrule. The extra length of the optical fibers must be trimmed to a predetermined length before the optical ferrules can be used. Typically, the optical fibers are cut off by mechanical means or by a laser. However, the trimmed optical fibers are typically still too long and have a shape or profile that is inadequate for mating with other optical ferrules or optical equipment. A second process is typically needed to further reduce the length of the optical fibers and to shape the end of the optical fibers for use. This second process is typically a polishing process that requires great precision, yet still produces inconsistent results. The introduction of the second process also increases the processing time and cost of the optical ferrules. Additionally, the polishing process tends to preferentially remove portions of the optical fiber, providing a less than optimum optical fiber profile. Therefore, a new optical ferrule with a covering on at least a portion of the end face of the optical ferrule is needed so that only a trimming process is needed. A method for applying the covering to the front face of the optical ferrule is also needed. In addition, an associated method for ablating the optical fiber(s) protruding from the ferrule in a single process is also needed.

SUMMARY OF THE INVENTION

To achieve these and other advantages and in accordance with the purpose of the invention as embodied and broadly described herein, the invention is directed in one aspect to an optical ferrule for securing at least one optical fiber that includes a ferrule body extending between a front face and a rear face, at least one opening extending through the ferrule body between the front face and rear face, and a first covering on at least a portion of the front face of the ferrule to reflect light from a laser used to trim one or more optical fibers protruding from the front face of the optical ferrule.

In another aspect, the invention is directed to a method of applying a covering on a front face of an optical ferrule that includes the steps of providing an optical ferrule having a ferrule body extending between a front face and a rear face, the optical ferrule also having at least one opening extending through the ferrule body between the front face and rear face; depositing a first covering on the front face of the ferrule by a thin film deposition; and rotating the optical ferrule during the depositing step.

In yet another aspect, the invention is directed to method of trimming an optical fiber to less than about 30 nm protrusion from an optical ferrule that includes the steps of providing an optical ferrule having ferrule body extending between a front face and a rear face, the optical ferrule also having at least one opening extending through the ferrule body between the front face and rear face and a reflective covering on at least a portion of the front face; securing an optical fiber in the opening in the optical ferrule so that at least a portion of the optical fiber protrudes beyond the front face of the optical ferrule; trimming the optical fiber protruding beyond the front face of the optical fiber to less than about 100 nm with a laser, and removing the portions of the optical fiber that are trimmed from the optical ferrule.

Additional features and advantages of the invention are set out in the detailed description which follows and will be readily apparent to those skilled in the art from that description or recognized by practicing the invention as described herein, including the detailed description which follows, including the claims and the appended drawings.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Reference will now be made in detail to exemplary embodiments of the invention, examples of which are described herein and shown in the accompanying drawings. Whenever practical, the same reference numerals are used throughout the drawings to refer to the same or similar parts or features. One embodiment of an optical ferrule according to the present invention is illustrated in FIGS. 1-4 and is designated generally throughout the following detailed description by the reference numeral 100.

Figure 5:
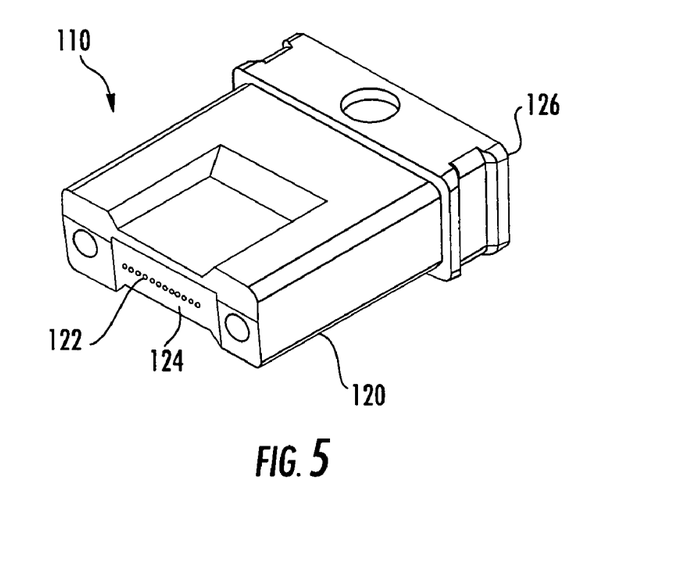
FIG. 5 is perspective view of another embodiment of an optical ferrule according to the present invention.

The optical ferrule 100 has a ferrule body 102 that extends lengthwise between a front face 104 and a rear face 106. The ferrule body 102 also has at least one opening 108 that extends lengthwise through the ferrule body 102 between the front face 104 and the rear face 106. An SC ferrule is illustrated in FIGS. 1-4, but any optical ferrule with any form factor may be used. Additionally, the optical ferrule 100 may be installed in different housings and holders. Additionally, as illustrated in FIG. 5 and described in more detail below, a multi-fiber ferrule 110 (an MT ferrule is illustrated) may also be used with the present invention.

The optical ferrule 100 has at least a first covering 112 (FIGS. 2-4) disposed on at least a portion of the front face 104. The first covering 112 is preferably a thin layer of an inert, reflective material that prevents damage to the front face 104 from a laser used to trim an optical fiber 114 (FIG. 3) secured in the opening 108. The first covering 112 is preferably gold, which has a high reflective value at the laser wavelength of the lasers typically used to trim optical fibers (typically a $CO_2$ laser operating at 10.6 µm), but other lasers at other wavelengths may also be used. Other materials for the first covering 112 may also be used as long as they reflect the laser beam at the wavelength of the laser that is used, thereby preventing damage to the front face 104 of the optical ferrule 100. Examples of other materials that may be used as first coverings include copper and aluminum, but other inert materials having a high reflective value may also be used.

The first covering 112 is preferably applied only to the front face 104 of the optical ferrule 100 and is preferably about 300 nm thick. As illustrated in FIGS. 1-4, the optical ferrule 100 may also have a chamfered portion 116, which is usually adjacent to the front face 104, as illustrated. In the preferred embodiment of the optical ferrule 100 according to the present invention, the chamfered portion 116 preferably does not have the first covering 112 thereon, although it may have the first covering 112 as well. (See, e.g., optical ferrule in FIG. 10). The application of the first covering 112 on the chamfered portion 116 may be needed if the laser beam that is used to trim the optical fibers may contact that portion of the optical ferrule 100. However, even if the laser beam were not to touch the chamfered portion 116, it may be more cost-effective to apply the coverings to the chamfered portion 116 rather than to protect the chamfered portions 116 from having the coverings applied thereto. It may also be a matter of customer preference since the presence or absence of the coverings on the chamfered portion 116 does not affect the performance of the optical ferrules 110. It should also be noted that the covering 112 need not cover all of the front face 104, but only those areas that will be exposed to the laser beam during the trimming process.

Figure 1:
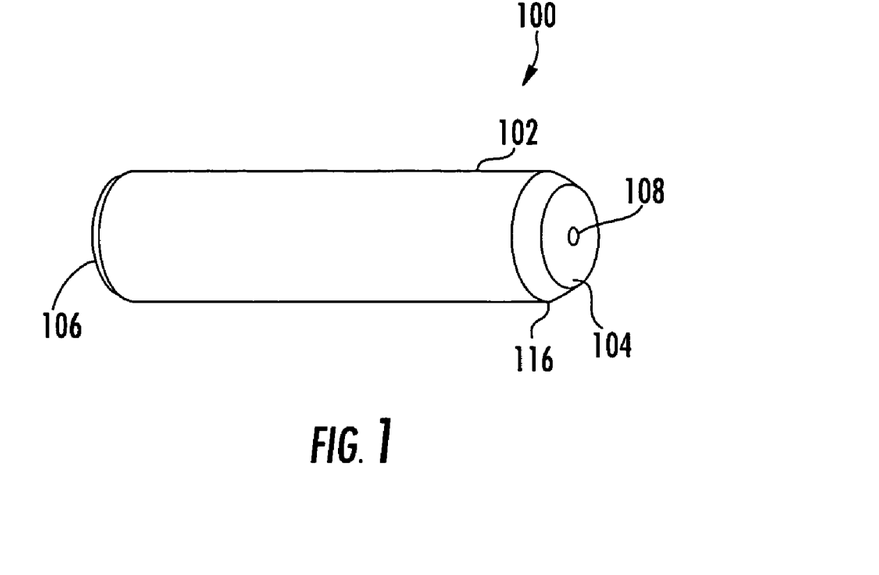
FIG. 1 is a perspective view of one embodiment of an optical ferrule according to the present invention.
Figure 2:
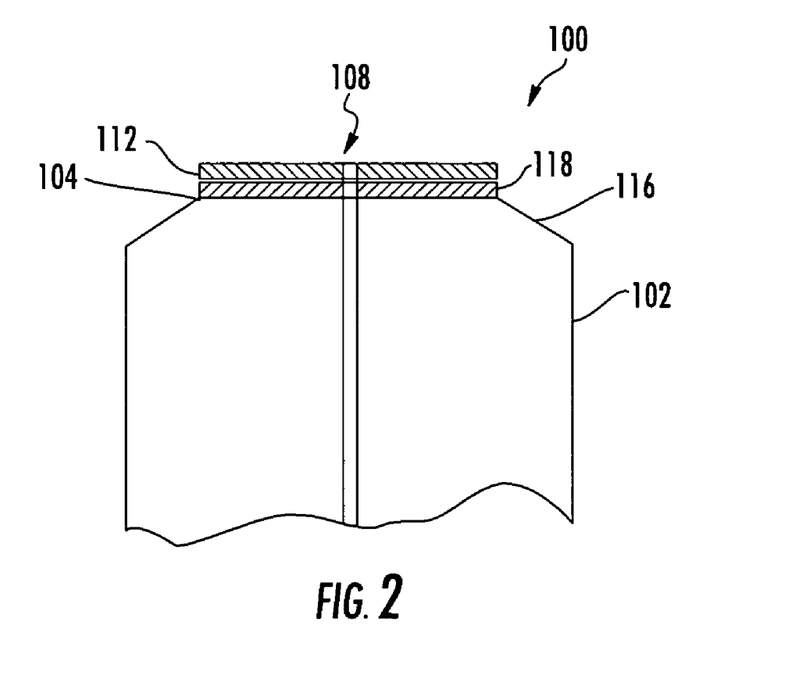
FIG. 2 is a lengthwise cross sectional view of a portion of the optical ferrule of FIG. 1 showing the coverings disposed on the front face.
Figure 3:
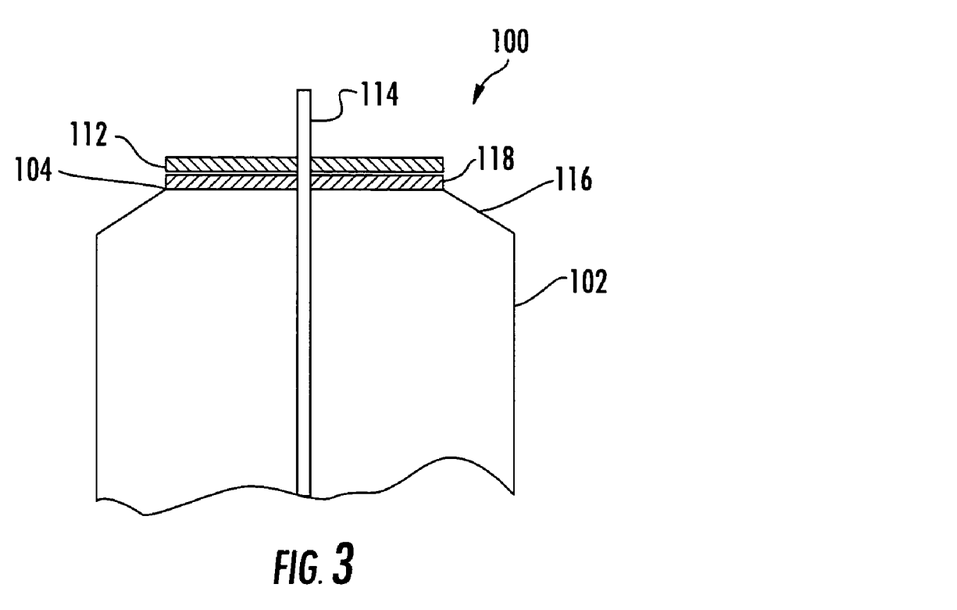
FIG. 3 is a lengthwise cross sectional view of the optical ferrule of FIG. 2 shown with an optical fiber protruding beyond the opening in the optical ferrule.
Figure 4:
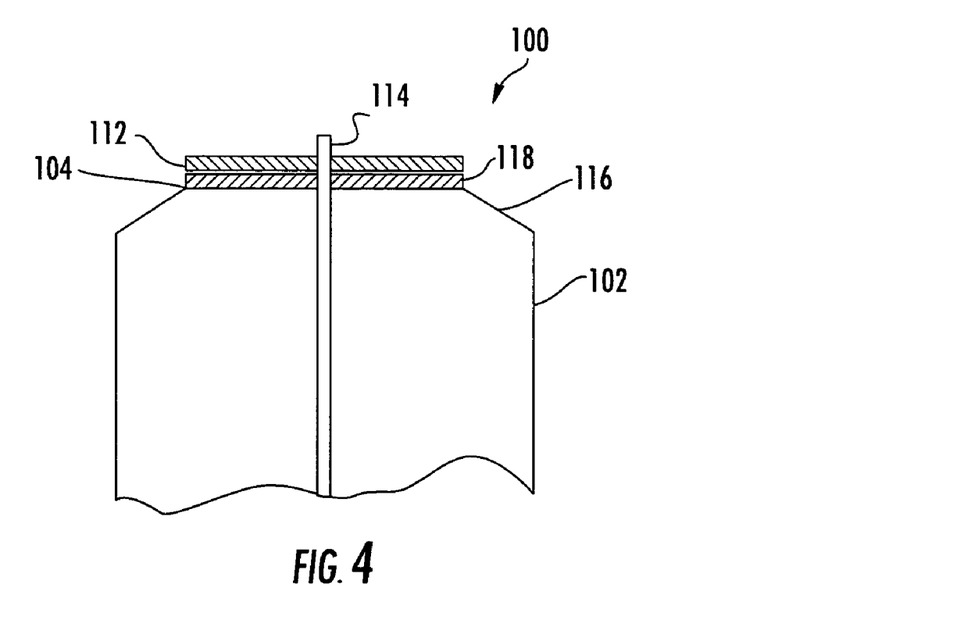
FIG. 4 is a lengthwise cross sectional view of the optical ferrule of FIG. 3 shown with the optical fiber trimmed according to the present invention.

The optical ferrule 100 may also have a second covering 118 as illustrated best in FIG. 2. The second, or inner, covering 118 is disposed between the front face 104 (and may include a chamfered portion 116 if appropriate) and the first covering 112 and assists in adhering the first covering 112 to the front face 104 of the optical ferrule 100. The optical ferrule 100 is typically made of a ceramic material and the second covering 118 assists in bonding the first covering 112 to the ceramic optical ferrule 100. The material used for the second covering 118 is preferably chromium, but aluminum and titanium may also be used. The second covering 118 is preferably about 30 nm thick, but may be thicker or thinner depending on the material to be used. It should be noted that if aluminum is to be used as the first covering 112, then no second covering 118 of aluminum is required as long as the thickness of the first covering is sufficient.

The first covering 112 and the second covering 118 are preferably applied to the front face of the ferrule by one of several methods. Preferably, the coverings 112,118 are applied by standard thin film deposition techniques. Other possible techniques for applying the coverings 112,118, such as sputter deposition, resistive deposition, and ion-assisted deposition, may also be used. Any other mechanical methods may also be used.

Figure 6:
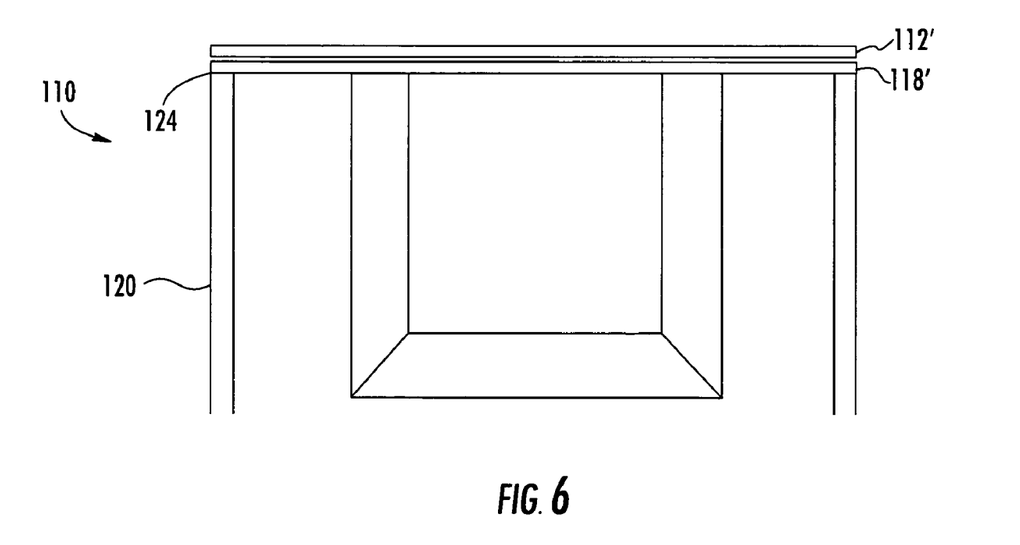
FIG. 6 is an enlarged top view of a portion of the optical ferrule of FIG. 5 showing the coverings disposed on the front face.

As shown in FIGS. 5-6, a multi-fiber ferrule 110 also has a ferrule body 120 that has at least one opening 122 extending lengthwise therethrough between a front face 124 and a rear face 126. The multi-fiber ferrule 110 preferably has a first covering 112' and a second covering 118' as well. As with the previous embodiment, the multi-fiber ferrule 110 need not have the second covering 118', but may only have the first covering 112'. The materials use for the first covering 112' and the second covering 118' are preferably the same as in the first embodiment. Also, while an MT ferrule is illustrated in FIGS. 5 & 6, any multi-fiber ferrule may be used without departing from the intended scope of the present invention.

Figure 7:
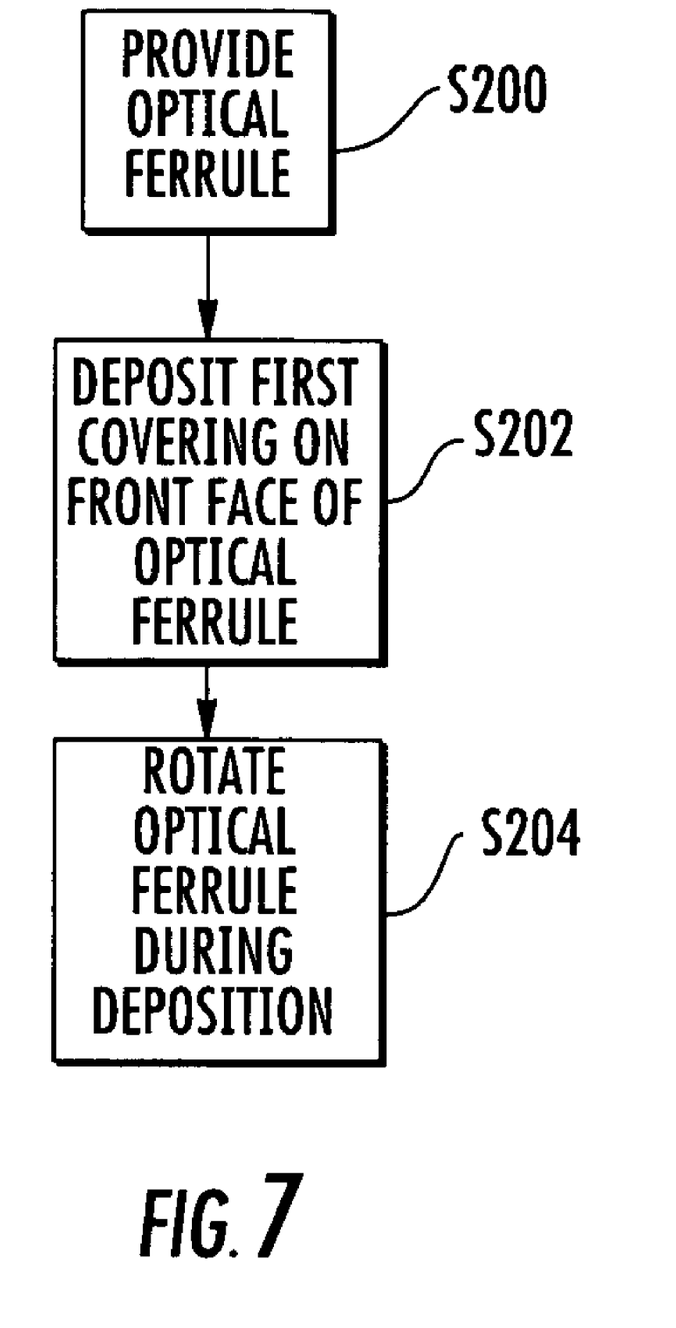
FIG. 7 is a flow chart illustrating a method of applying a covering to an optical ferrule according to the present invention.

An exemplary method of applying the coverings to the optical ferrules (100,110) will now be discussed with reference to FIG. 7. As indicated at step S200, an optical ferrule is provided. Preferably, the optical ferrule has a ferrule body extending between a front face and a rear face, as with optical ferrule 100 or optical ferrule 110. The optical ferrule also has at least one opening extending through the optical ferrule and between the front and rear faces. The optical ferrule at step S202 has a first covering deposited on the front face of the optical ferrule, preferably by thin film deposition. The deposition of the first covering may also be performed by sputter deposition, resistive evaporation, or ion-assisted deposition. The deposition of the first covering is preferably performed at a rate of about 1.0 to about 3.0 nm/sec of thickness until a thickness of about 300 nm of the first covering is applied.

As indicated at step S204, the deposition of the first covering is performed while the ferrule is rotating. During this step S204, the optical ferrule preferably rotates around a longitudinal axis that is parallel to the at least one opening extending through the ferrule body. The first covering is preferably applied during rotation of the optical ferrule to provide for a more uniform application of the first covering, although it is not necessary to rotate the ferrule during application of the coverings.

Figure 8:
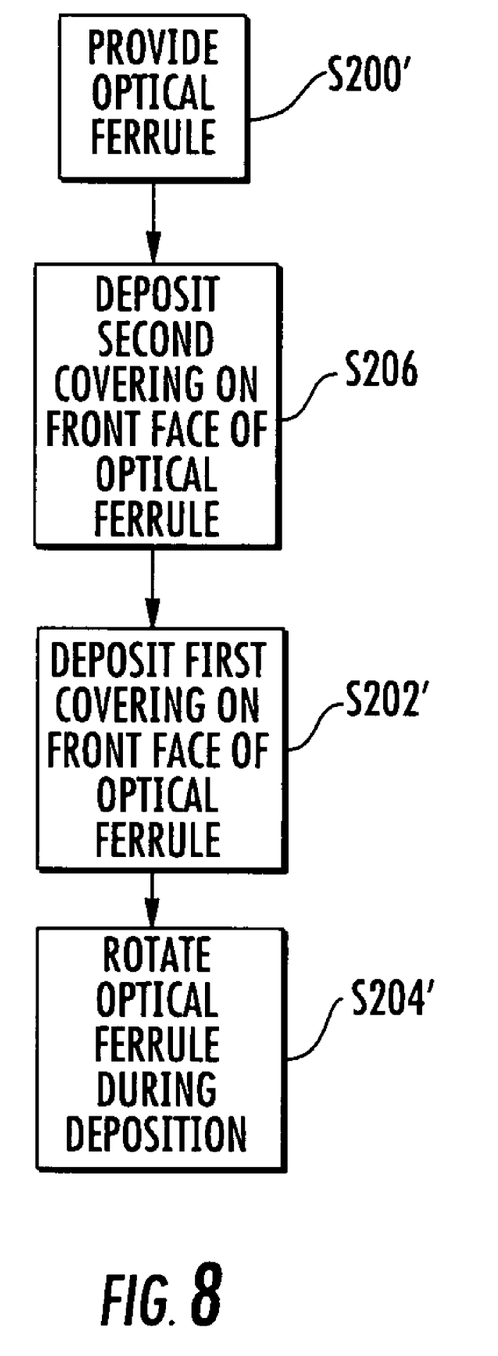
FIG. 8 is a flow chart illustrating another method of applying coverings on an optical ferrule according to the present invention.

The second covering may also be applied as illustrated in FIG. 8. The steps S200', S202' and S204' are the same as illustrated as described above with reference to FIG. 7. New step S206 in this embodiment of the method of applying the coverings is performed before the step of depositing the first covering on the front face of the ferrule. As noted above, the second covering (118, 118') is to assist in the first covering (112, 112') adhering to the front face of the optical ferrule and thus must be deposited before the first covering. The ferrule is also preferably rotated around a longitudinal axis during the step of depositing the second covering (S206). The deposition of the second covering is preferably applied at a rate of about 0.5 to about 1.5 nm/second of thickness to a total thickness of about 30 nm.

Figure 9:
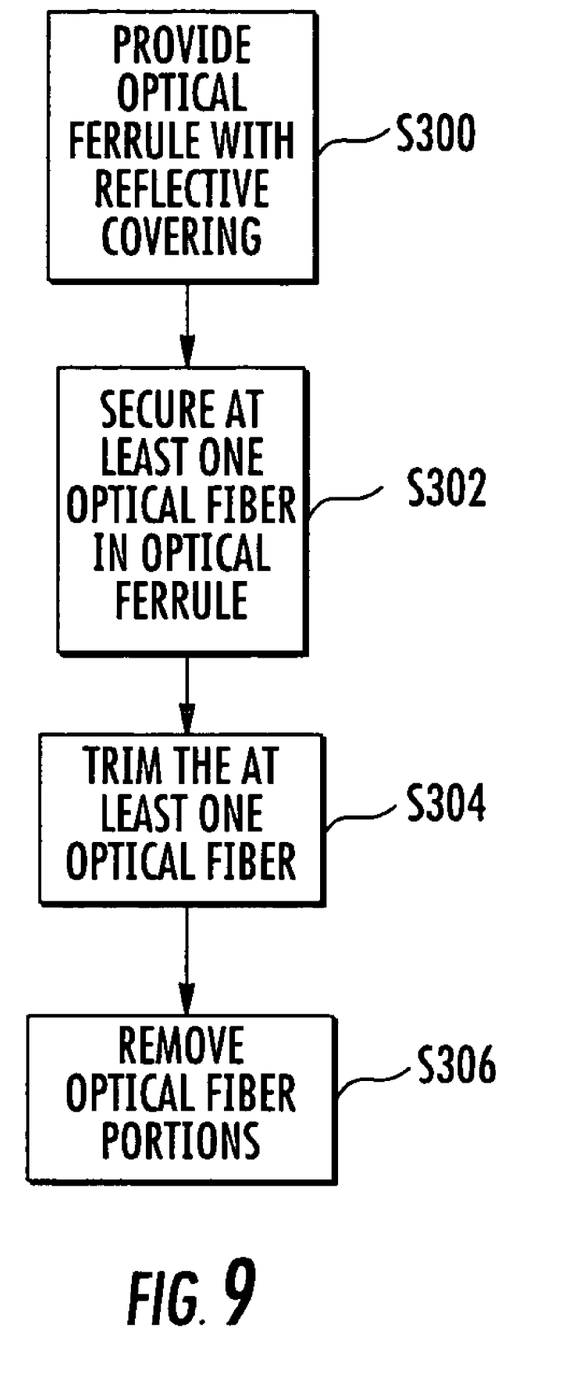
FIG. 9 is a flow chart illustrating a method of ablating an optical fiber protruding from an optical ferrule according to the present invention.
Figure 10:
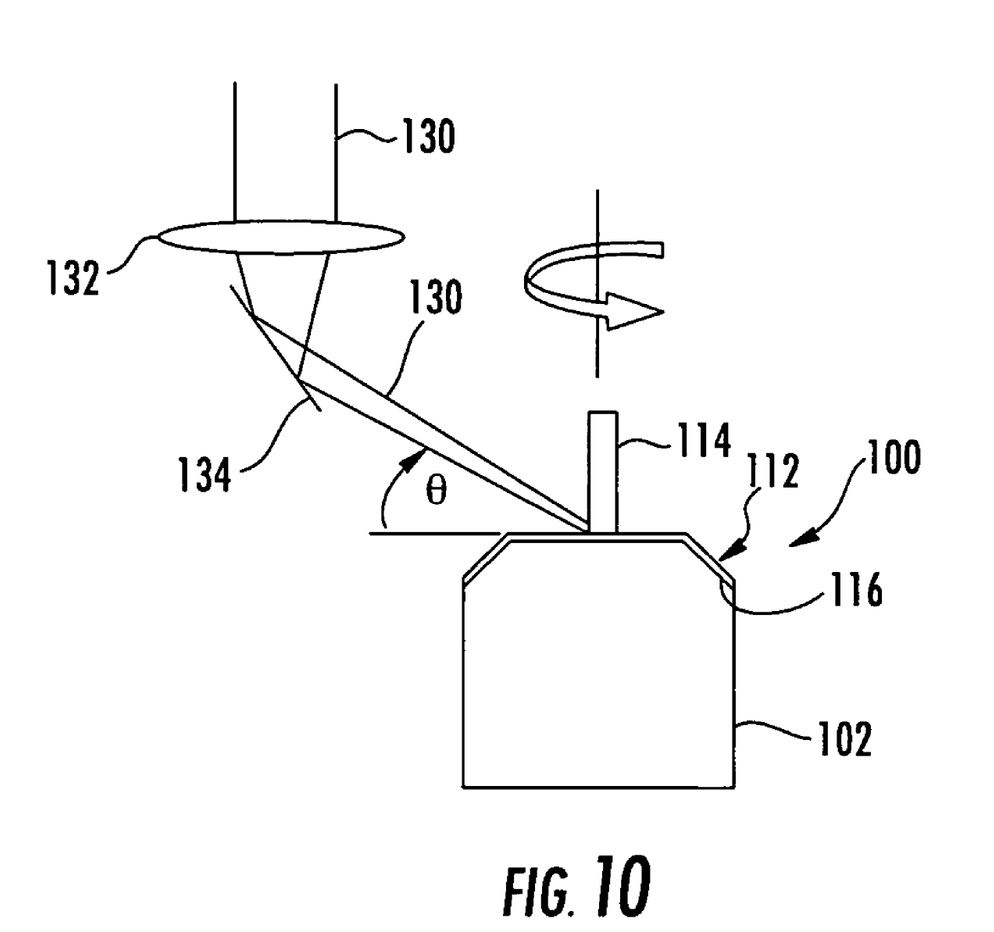
FIG. 10 is a schematic illustrating an exemplary set up for trimming an optical fiber protruding from an optical ferrule according to the present invention.

The use of the optical ferrule 100,110 for ablating an optical fiber protruding from the front face 104 of the ferrule will be explained with reference to FIGS. 9 and 10. As used herein, the term "trimming" means reducing the length of a portion of an optical fiber protruding beyond the front face of the ferrule. As described herein with respect to the exemplary embodiment provided herein, trimming is accomplished by ablating the optical fiber. More specifically, trimming is done with a laser that, as is known in the prior art, ablates at least a portion of the protruding optical fiber. As is also known in the art, pieces of the trimmed optical fiber may remain (i.e., a portion of the protruding optical fiber between the end of the optical fiber and the point where the laser ablates the optical fiber) after the optical fiber is trimmed by the laser. As indicated at step S300, an optical ferrule having a reflective covering, such as the first covering or the first and second coverings described above, is provided. The optical ferrule also has a ferrule body extending lengthwise between a front face and a rear face and at least one opening extending lengthwise therethrough. At least one optical fiber is secured in the at least one opening in the optical ferrule at step S302. If there is more than one opening in the optical ferrule, then a corresponding number of optical fibers are preferably installed. The securing of the optical fiber is well-known in the art and is typically done with an epoxy. A portion of the optical fiber(s) protrudes beyond the front face of the optical ferrule. See, e.g., FIG. 10. This portion of the optical fiber(s) that protrudes beyond the front face is trimmed to about 30 nm or less, and more preferably to less than about 15 nm. A $CO_2$ laser is preferably used at step S304 to trim the at least one optical fiber, although any appropriate laser could be used. While a single fiber ferrule is illustrated in FIG. 10, a multi-fiber ferrule, such as multi-fiber ferrule 110, may be used as well. The laser beam 130, as illustrated in FIG. 10, is directed through a lens 132 onto a galvanometer 134. The galvanometer 134 sweeps the laser beam 130 in one dimension across the optical fiber and, to an extent, across the covered front face of the optical ferrule. The galvanometer 134 is preferably moved by a signal that is a pulsed sine wave, while the laser beam 130 is maintained in a constant "on" state. The galvanometer 134 is set so that the laser beam 130 is clear of the optical fiber 114 and front face 104 of the optical ferrule 100 during the dwell portion of the signal to the galvanometer so that too much energy is not input into the optical fiber 114 and front face 104 of the optical ferrule 100. This also allows the optical fiber and front face of the optical ferrule to dissipate the energy from the laser beam between sweeps of the galvanometer 134.

The laser beam 130 is also preferably directed at the optical fiber 114 and front face 104 of the optical ferrule 100 at an angle θ relative to the front face 104 of the optical ferrule 100 that is between 0 and 90°. The angle θ is more preferably between about 28 and about 30°. It is also preferable that the optical ferrule 100 rotates around a longitudinal axis during the trimming of the optical fiber 114. Preferably the optical ferrule is rotated between 60 and 240 rpm to create a symmetric geometry on the end of the optical fiber. However, it is not necessary to rotate the optical ferrule to achieve the symmetric geometry. In fact, it would not be easy to rotate a multi-fiber ferrule during the trimming of the optical fibers.

As discussed above, the laser beam 130 may also be directed onto the optical fiber 114 at an angle θ of 90° (i.e., along the axis of the optical fiber 114). In this case, the laser beam 130 is preferably not directed through the galvanometer 134, but instead directly onto the optical fiber 114. The laser beam 130 would be pulsed to avoid heat build up. The laser beam 130, which is preferably larger in diameter than the optical fiber 114, would ablate the optical fiber 114 as well as any excess epoxy that surrounds the optical fiber 114 (from securing the optical fiber 114 in the optical ferrule 100). The coverings 112, 112' protect the front face 104 of the optical ferrule from the laser beam 130 that extends outside the diameter of the optical fiber 114. The optical ferrule 100 may also be rotated as described above.

At step S306, the portions of the optical fiber(s) 114 that were trimmed in step S304 are removed, preferably by a vacuum or by positive air flow around the front face 104 of the optical ferrule 100,110.

It will be apparent to those skilled in the art that various modifications and variations can be made in the optical planar splitter of the present invention without departing from the spirit or scope of the invention. Thus, it is intended that the present invention cover the modifications and variations of this invention provided they come within the scope of the appended claims and their equivalents.

What is claimed is:

1. A method of applying a covering to a front face of an optical ferrule comprising the steps of:
   providing an optical ferrule having a ferrule body extending between a front face and a rear face, the optical ferrule also having at least one opening extending through the ferrule body between the front face and the rear face;
   depositing an adherence covering to the front face of the ferrule;
   depositing a reflective covering on the adherence covering by a thin film deposition; and
   rotating the optical ferrule during the depositing of the reflective covering.

2. The method of applying a covering to a front face of a ferrule according to claim 1, wherein the reflective covering is applied at a rate of about 1.0-3.0 nm/sec and has a thickness of about 300 nm.

3. The method of applying a covering to a front face of a ferrule according to claim 1, wherein the adherence covering is applied at a rate of about 0.5-1.5 nm/sec and has a thickness of about 30 nm.

* * * * *